US012266850B2

(12) United States Patent
Eslami et al.

(10) Patent No.: US 12,266,850 B2
(45) Date of Patent: Apr. 1, 2025

(54) METHOD AND SYSTEM FOR CONTROLLING A MODAL ANTENNA

(71) Applicant: KYOCERA AVX Components (San Diego), Inc., San Diego, CA (US)

(72) Inventors: Hamid Eslami, San Diego, CA (US); Michael Roe, San Diego, CA (US); Jatan Shah, Irvine, CA (US); Amin Shameli, Irvine, CA (US); Syed Khursheed Enam, Lake Forest, CA (US); Jesse Shih-Chieh Hsin, San Diego, CA (US); Rozi Rofougaran, Santa Monica, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 18/350,510

(22) Filed: Jul. 11, 2023

(65) Prior Publication Data

US 2023/0352821 A1    Nov. 2, 2023

Related U.S. Application Data

(63) Continuation of application No. 17/343,847, filed on Jun. 10, 2021, now Pat. No. 11,742,567, which is a
(Continued)

(51) Int. Cl.
*H01Q 1/36* (2006.01)
*H01Q 3/28* (2006.01)
*H01Q 5/378* (2015.01)

(52) U.S. Cl.
CPC ............. *H01Q 1/36* (2013.01); *H01Q 3/28* (2013.01); *H01Q 5/378* (2015.01)

(58) Field of Classification Search
CPC .. H01Q 1/36; H01Q 3/00; H01Q 3/28; H01Q 3/44; H01Q 5/378; H04B 1/40; H04B 1/401
See application file for complete search history.

(56) References Cited

U.S. PATENT DOCUMENTS 6,765,536 B2    7/2004  Phillips et al.
6,987,493 B2    1/2006  Chen
(Continued)

FOREIGN PATENT DOCUMENTS

CN    101714961 A    5/2010
CN    102104432 A    6/2011
(Continued)

OTHER PUBLICATIONS

PCT International Search Report and Written Opinion for corresponding PCT Application No. PCT/US2019/039769, mailed on Oct. 21, 2019, 15 pages.
(Continued)

*Primary Examiner* — Myron Wyche
(74) *Attorney, Agent, or Firm* — Dority & Manning, P.A.

(57) ABSTRACT

A system for communicating data over a transmission line is disclosed. In one example implementation, the system may include a transmitter configured to modulate a control signal onto an RF signal using amplitude-shift keying modulation to generate a transmit signal. The system may include a receiver and a transmission line coupling the transmitter to the receiver. The transmitter may be configured to transmit the transmit signal over the transmission line to the receiver, and the receiver may be configured to de-modulate the control signal and extract clock information associated with the transmitter. In some embodiments, the system may include a tuning circuit and a modal antenna, and the tuning circuit may be or include the receiver. The receiver may be
(Continued)

configured to adjust a mode of the modal antenna based on the control signal transmitted by the transmitter.

20 Claims, 9 Drawing Sheets

Related U.S. Application Data continuation of application No. 16/456,460, filed on Jun. 28, 2019, now abandoned.

(60) Provisional application No. 62/744,274, filed on Oct. 11, 2018, provisional application No. 62/718,430, filed on Aug. 14, 2018.

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin | |
| 7,907,005 B2 | 3/2011 | Kranabenter | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,123,986 B2 | 9/2015 | Shamblin et al. | |
| 9,231,669 B2 | 1/2016 | Desclos et al. | |
| 9,240,634 B2 | 1/2016 | Rowson et al. | |
| 9,325,543 B2 | 4/2016 | Desclos et al. | |
| 9,425,497 B2 | 8/2016 | Pajona et al. | |
| 9,439,151 B2 | 9/2016 | Zbu et al. | |
| 9,479,242 B2 | 10/2016 | Desclos et al. | |
| 9,590,703 B2 | 3/2017 | Desclos et al. | |
| 9,755,305 B2 | 9/2017 | Desclos et al. | |
| 9,755,580 B2 | 9/2017 | Desclos et al. | |
| 9,768,991 B2 | 9/2017 | Desclos et al. | |
| 10,263,817 B1 | 4/2019 | Roe et al. | |
| 10,461,914 B2 * | 10/2019 | Lin | H04L 5/14 |
| 10,587,438 B2 | 3/2020 | Roe et al. | |
| 11,245,189 B2 | 2/2022 | Desclos et al. | |
| 11,742,567 B2 * | 8/2023 | Eslami | H04L 27/02 343/700 R |
| 2002/0159511 A1 | 10/2002 | Wilson | |
| 2005/0094745 A1 | 5/2005 | Miyanaga et al. | |
| 2006/0023734 A1 | 2/2006 | Yanagida et al. | |
| 2006/0050005 A1 * | 3/2006 | Shirosaka | H01Q 3/36 343/757 |
| 2006/0171393 A1 | 8/2006 | Lin et al. | |
| 2007/0249312 A1 | 10/2007 | Shatara et al. | |
| 2008/0238682 A1 | 10/2008 | Kuwako et al. | |
| 2010/0277368 A1 | 11/2010 | Ponnuswamy | |
| 2011/0254748 A1 | 10/2011 | Rowson et al. | |
| 2012/0309325 A1 | 12/2012 | Carbone et al. | |
| 2013/0107913 A1 | 5/2013 | Savoj | |
| 2013/0135162 A1 | 5/2013 | Shamblin et al. | |
| 2015/0311969 A1 | 10/2015 | Desclos | |
| 2017/0012681 A1 | 1/2017 | Buliga et al. | |
| 2017/0338557 A1 | 11/2017 | Desclos | |
| 2020/0091608 A1 | 3/2020 | Alpman et al. | |

FOREIGN PATENT DOCUMENTS

| | | | |
|---|---|---|---|
| CN | 104980149 A | 10/2015 | |
| EP | 0413355 A2 * | 2/1991 | H04B 1/40 |
| EP | 0558210 A1 * | 2/1993 | H04B 7/005 |
| EP | 0602608 A1 * | 12/1993 | H04B 1/38 |
| JP | 2006253844 | 9/2006 | |
| JP | 2010028318 | 2/2010 | |
| JP | 2013239844 | 11/2013 | |
| KR | 10-2009-0001038 | 1/2009 | |
| KR | 10-2009-0120282 | 11/2009 | |

OTHER PUBLICATIONS

European Search Report for Application No. EP 19 85 0210.6, mailed Apr. 12, 2022, 8 pages.

* cited by examiner

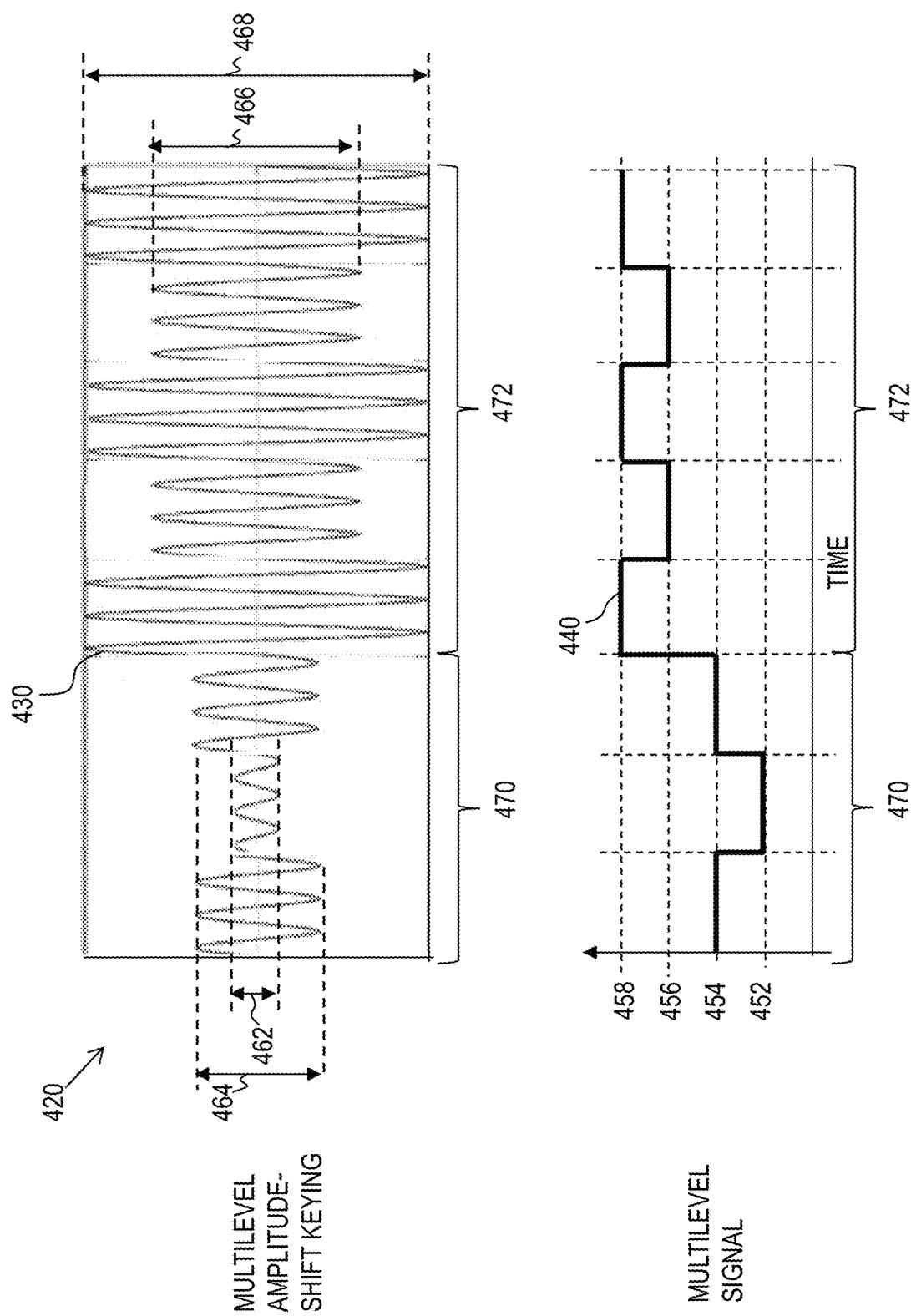

METHOD AND SYSTEM FOR CONTROLLING A MODAL ANTENNA

RELATED APPLICATIONS

This application is a continuation of U.S. patent application Ser. No. 17/343,847, filed on Jun. 10, 2021, which is a continuation of and claims priority to U.S. patent application Ser. No. 16/456,460, filed on Jun. 28, 2019, which claims priority to and the benefit of U.S. Provisional Patent Application No. 62/718,430 filed on Aug. 14, 2018 and U.S. Provisional Patent Application No. 62/744,274 filed on Oct. 11, 2018, each of which is incorporated by reference herein.

FIELD

Example aspects of the present disclosure relate generally to the field of antenna control, for instance, the control of modal antennas configured to operate in a plurality of different modes.

BACKGROUND

Modal antennas are being increasingly used in wireless communication, for instance in smartphone handsets. Such antennas generally provide improved signal quality and a more compact form factor than traditional passive antennas. One modal antenna configuration involves a parasitic element configured to alter a radiation pattern associated with a driven element. In such a configuration, a first transmission line may connect the driven element with a circuit configured to drive the driven element. A separate transmission line may connect a circuit configured to vary the modal properties of the modal antenna with the parasitic element.

SUMMARY

Aspects and advantages of embodiments of the present disclosure will be set forth in part in the following description, or may be learned from the description, or may be learned through practice of the embodiments.

One example aspect of the present disclosure is directed to a system comprising a transmitter configured to modulate a control signal onto an RF signal using amplitude-shift keying modulation to generate a transmit signal. The system may include a receiver and a transmission line coupling the transmitter to the receiver. The transmitter may be configured to transmit the transmit signal over the transmission line to the receiver. The receiver may be configured to de-modulate the control signal. The receiver may be configured to extract clock information associated with the transmitter.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4B illustrates a series of time-aligned charts representing simplified examples of multilevel amplitude-shift keying modulation;

Figure 1A:
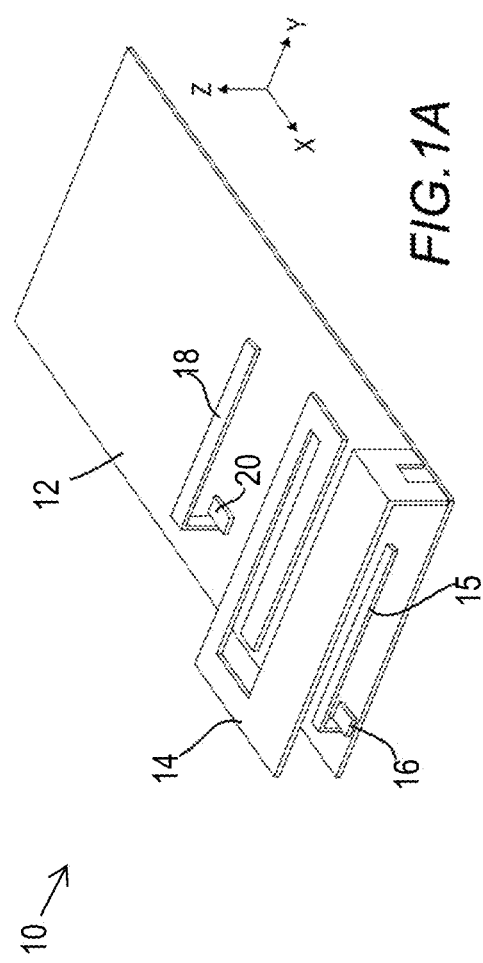
FIG. 1A illustrates an embodiment of a modal antenna according to example embodiments of the present disclosure.

Repeat use of reference characters in the present specification and drawings is intended to represent same or analogous features or elements of the invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a system for communicating data over a transmission line. The system may include a transmitter configured to modulate a control signal onto an RF signal using amplitude-shift keying modulation to generate a transmit signal. The system may include a receiver and a transmission line coupling the transmitter to the receiver. The transmitter may be configured to transmit the transmit signal over the transmission line to the receiver. The receiver may be configured to extract clock information associated with the transmitter. The receiver may be configured to de-modulate the control signal, for example based on the extracted clock information. In some embodiments, the system may include a tuning circuit. The system may also include a modal antenna. The tuning circuit may be or include the receiver. The receiver may be configured to adjust a mode of the modal antenna based on the control signal transmitted by the transmitter.

The receiver may be configured to extract clock information from the transmit signal. The receiver may be configured to synchronize its operations with operations of the transmitter. For example, the receiver may be configured to demodulate the control signal using the extracted clock information. For instance, the receiver may be configured to locate a training portion within a data frame of the control signal. The receiver may be configured to then locate a data portion within the data frame based on the location of the training portion. The operations of the receiver may include controlling an electrical characteristic associated with the parasitic element to operate the modal antenna in a plurality of different modes.

In some embodiments, the receiver may be free of a clock source that is separate from a clock source of the transmitter (e.g., the sinusoidal wave source 134 associated with the control circuit 118). Instead, the receiver may use the extracted clock information associated with the clock source of the transmit signal to demodulate the control signal.

As indicated above, the transmitter can be configured to modulate a control signal onto an RF signal using amplitude-shift keying modulation to generate a transmit signal. The amplitude-shift keying modulation may include binary or multilevel amplitude-shift keying. Multilevel amplitude-shift keying modulation may be described as "m-ary," where m represents an integer greater than two. For example, a multilevel control signal may switch between a various voltage levels in a manner that describes a data set having a bit depth greater than two. The plurality of voltage levels of the multilevel signal may be represented as a carrier signal (e.g., a sinusoidal signal) having varying amplitudes.

In some embodiments, the control signal may include a data frame that includes a training portion and a data portion. The receiver may be configured to identify a location of the training portion within the data frame. The receiver may locate at least one of a start of the data frame, an end of the data frame, or the data portion within the data frame based on the identified location of the training portion within the data frame.

Additionally, employing amplitude-shift keying modulation as described herein may provide several technical effects and benefits. For example, the RF signal and control signal may be transmitted (as components of the transmit signal) via a single transmission line with low interference and/or noise. Amplitude-shift keying may produce reduced resonations at harmonic frequencies associated with the control signal and/or RF signal. This may reduce the noise associated with modulating the control signal onto the RF signal and demodulating the control signal. The resulting high fidelity transmission of the control signal may provide accurate and efficient control over the operation of the modal antenna.

Additionally, according to aspects of the present disclosure, extracting clock information from the transmit signal may facilitate fast, low latency data transmission (e.g., over a signal coaxial cable). The resulting data transmission fidelity and speed may contribute to the accurate and efficient control over the operation of the modal antenna.

Example aspects of the present disclosure are directed to a system for communicating data over a transmission line. The system may include a transmitter configured to modulate a control signal onto an RF signal using amplitude-shift keying modulation to generate a transmit signal. The system may include a receiver and a transmission line coupling the transmitter to the receiver. The transmitter may be configured to transmit the transmit signal over the transmission line to the receiver. The receiver may be configured to de-modulate the control signal. The receiver may be configured to extract clock information associated with the transmitter.

In some embodiments, the receiver may be free of a clock source.

In some embodiments, the control signal may include a data frame. The receiver may be configured to identify at least one of a start or an end of the data frame. In some embodiments, the data frame may include a training portion. The receiver may be configured to recognize the training portion to identify at least one of a start or an end of the data frame. In some embodiments, the data frame may include a training portion and a data portion. The receiver may be configured to identify a location of the training portion and locate the data portion within the data frame based on the identified location of the training portion within the data frame.

In some embodiments, the transmitter may be configured to modulate the control signal onto the RF signal using binary amplitude-shift keying modulation. In some embodiments, the transmitter may be configured to modulate the control signal onto the RF signal using multi-level amplitude-shift keying modulation.

In some embodiments, the transmitter may be configured to modulate a clock signal onto the RF signal using multi-level amplitude-shift keying. In some embodiments, the transmitter may be configured to modulate the clock signal onto the RF signal using a first set of amplitude levels. The transmitter may be configured to modulate the control signal onto the RF signal using a second set of amplitude levels that includes at least one amplitude level that is distinct from the first set of amplitude levels.

In some embodiments, the transmitter may be configured to modulate the control signal onto the RF signal by selectively varying an amplitude associated with a carrier signal between a first amplitude and a second amplitude. In some embodiments, the transmitter may be configured to modulate a clock signal onto the RF signal by selectively varying the amplitude associated with the carrier signal to a third amplitude that is distinct from the first amplitude and second amplitude. The carrier signal may include at least one of a generally constant frequency sinusoidal wave or a repeating pattern.

In some embodiments, the transmission line may be a single coaxial cable.

In some embodiments, the receiver may be configured to synchronize operations of the receiver with operations of the transmitter based on the extracted clock information.

In some embodiments, the system may include a first circuit board and a second circuit board that is physically separate from the first circuit board. The transmitter may be disposed on the first circuit board. The receiver may be disposed on the second circuit board.

In some embodiments, the system may include a tuning circuit and a modal antenna. The tuning circuit may include the receiver. The receiver may be configured to adjust a mode of the modal antenna based on the control signal. In some embodiments, the tuning circuit may be configured to perform IQ summation with respect to signals transmitted by the transmitter over the transmission line.

In some embodiments, the system may include a front end module and a control circuit. The front end module may be configured to generate the RF signal. The control circuit may be configured to generate the control signal.

One example aspect of the present disclosure is directed to a method for controlling a modal antenna. The method may include modulating, at a transmitter, a control signal onto an RF signal using amplitude-shift keying modulation to generate a transmit signal. The method may include communicating the transmit signal to a receiver via a single coaxial transmission line. The method may include extracting, at the receiver, clock information associated with the transmitter. The method may include demodulating, at the receiver, the control signal.

In some embodiments, the method may include controlling, from the transmitter, an electrical characteristic associated with a parasitic element of a modal antenna via the control signal to operate the modal antenna in a plurality of different modes. Each mode may be associated with a different radiation pattern for the modal antenna.

Another example aspect of the present disclosure is directed to an antenna system. The antenna system may include a modal antenna including a driven element and a parasitic element positioned proximate to the driven element. The modal antenna may be operable in a plurality of different modes. Each mode may be associated with a different radiation pattern. The antenna system may include a tuning circuit configured to control an electrical characteristic associated with the parasitic element to operate the modal antenna in the plurality of different modes. The antenna system may include a radio frequency circuit and a transmission line coupling the radio frequency circuit to the modal antenna. The radio frequency circuit may be configured to modulate a control signal onto an RF signal using amplitude-shift keying modulation to generate a transmit signal for communication over the transmission line to the tuning circuit. The tuning circuit may be configured to demodulate the control signal. The tuning circuit may be configured extract clock information from the control signal to interpret the control signal such that the radio frequency circuit can adjust a mode of the modal antenna via the control signal.

FIG. 1A illustrates an embodiment of a modal antenna 10 in accordance with aspects of the present disclosure. The modal antenna 10 may include a circuit board 12 (e.g., including a ground plane) and a driven antenna element 14 disposed on the circuit board 12. An antenna volume may be defined between the circuit board (e.g., and the ground plane) and the driven antenna element. A first parasitic element 15 may be positioned at least partially within the antenna volume. A first active tuning element 16 may be coupled with the parasitic element 15. The first active tuning element 16 can be a passive or active component or series of components and may be configured to alter a reactance on the first parasitic element 14 either by way of a variable reactance, or shorting to ground, resulting in a frequency shift of the antenna.

In some embodiments, a second parasitic element 18 may be disposed proximate the circuit board 12 and may be positioned outside of the antenna volume. The second parasitic element 18 may further include a second active tuning element 20 which may individually include one or more active and/or passive components. The second parasitic element 18 may be positioned adjacent the driven element 14 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active tuning element 16 and/or second active tuning element 18 may include at least one of a tunable capacitor, MEMS device, tunable inductor, switch, a tunable phase shifter, a field-effect transistor, or a diode.

Figure 1C:
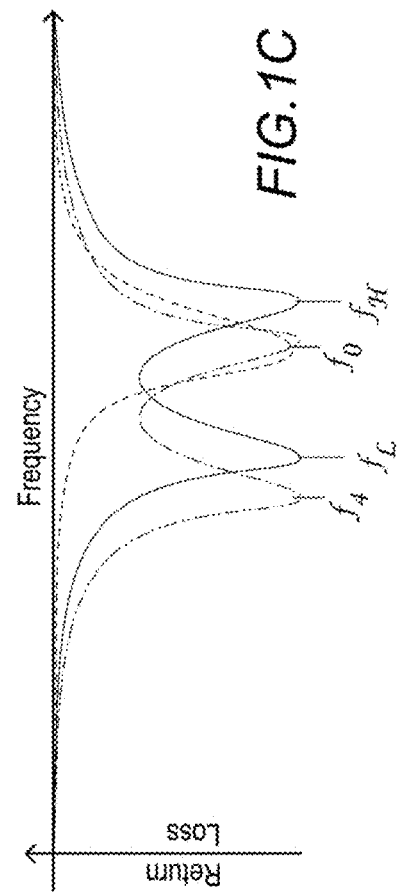
FIG. 1C illustrates an example frequency plot of the modal antenna of FIG. 1A according to example embodiments of the present disclosure.
Figure 1B:
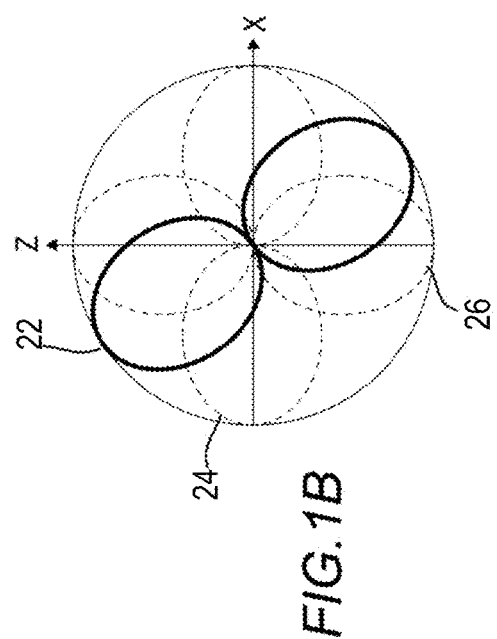
FIG. 1B illustrates a two-dimensional antenna radiation pattern associated with the modal antenna of FIG. 1A.

FIG. 1B illustrates a two-dimensional antenna radiation pattern associated with the modal antenna of FIG. 1A. The radiation pattern may be shifted by controlling an electrical characteristic associated with at least one of the first and second parasitic elements 16, 18 of the modal antenna 10. For example, in some embodiments, the radiation pattern may be shifted from a first mode 22 to a second mode 24, or a third mode 26.

FIG. 1C illustrates an example frequency plot of the modal antenna of FIG. 1A according to some aspects of the present disclosure. The frequency of the antenna can be shifted by controlling an electrical characteristic associated with at least one of the first or second parasitic elements 16, 18 of the modal antenna 10. For example, a first frequency ($f_0$) of the antenna may be achieved when the first and second parasitic elements are switched "Off", the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 1A-1C depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern or other antenna system characteristic.

Figure 2:
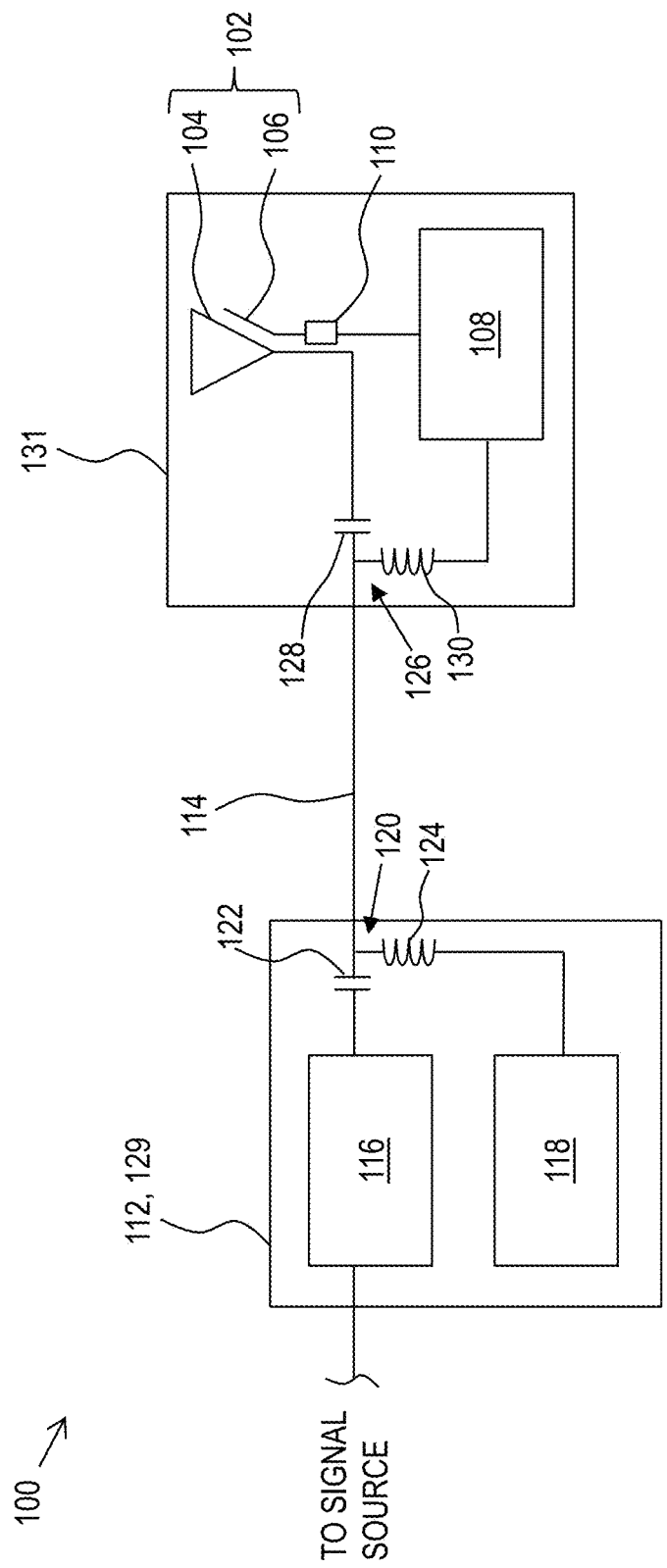
FIG. 2 illustrates a schematic diagram of an example antenna system according to example embodiments of the present disclosure.

FIG. 2 illustrates a schematic diagram of an embodiment of an antenna system 100 in accordance with example aspects of the present disclosure. The antenna system 100 may include a modal antenna 102. The modal antenna 102 may include a driven element 104 and a parasitic element 106 positioned proximate to the driven element 104. The modal antenna 102 may be operable in a plurality of different modes. Each mode may be associated with a different radiation pattern, for example as described above with reference to FIGS. 1A through 1C.

A tuning circuit 108 (e.g., a receiver) may be configured to control an electrical characteristic associated with the parasitic element 106 to operate the modal antenna 102 in the plurality of different modes. The tuning circuit 108 may be configured demodulate a control signal from a transmit signal and control the electrical characteristic of the parasitic element 106 based on control instructions associated with the control signal, for example as explained in greater detail with reference to FIGS. 4 and 5.

A tunable component 110 may be coupled with the parasitic element 106. The tuning circuit 108 may be configured to control the tunable component 110 to alter the electrical connectivity of the parasitic element 106 with a voltage or current source or sink, such as connecting the parasitic element 106 with ground.

A radio frequency circuit 112 (e.g., a transmitter) may be configured to transmit an RF signal to the driven element 104 of the modal antenna 102. For example, a transmission line 114 may couple the radio frequency circuit 110 to the modal antenna 102. In some embodiments, the transmission line 114 may be a single coaxial cable. The radio frequency circuit 112 may be configured to amplify or otherwise generate the RF signal, which is transmitted through the transmission line 114 (as a component of the transmit signal) to the driven element 104 of the modal antenna 102.

In some embodiments, the radio frequency circuit 112 may include a front end module 116 and/or a control circuit 118. The front end module 116 may be configured to generate and/or amplify the RF signal that is transmitted to the driven element 104. The control circuit 118 may be configured to modulate a control signal onto the RF signal using amplitude-shift keying modulation to generate the transmit signal, for example as explained in greater detail below with reference to FIGS. 4A and 4B.

The transmission line 114 may be coupled with various components (e.g., using Bias Tee circuits) that are configured to aid in the combination and/or separation of signals occupying various frequency bands. For example, a first Bias Tee circuit 120 may couple the front end module 116 and the control circuit 118 with the transmission line 114. The first Bias Tee circuit 120 may include a capacitor 122 coupling the transmission line 114 with front end module 116 and an inductor 124 coupling the control unit 118 with the transmission line 114. A second Bias Tee circuit 126 may couple the driven element 104 and the tuning circuit 108 with the transmission line 114. The second Bias Tee circuit 126 may include a capacitor 128 coupling the transmission line 114 with the driven element 104 and an inductor 130 coupling the transmission line 114 with the tuning circuit 108.

The front end module 116 may transmit the RF signal through the capacitor 122 of the first Bias Tee circuit 120. The control circuit 118 may modulate the control signal onto the RF signal through the inductor 124 of the first Bias Tee circuit 120 to generate the control signal in the transmission line 114.

The tuning circuit 108 (e.g., receiver) may be configured to de-modulate the control signal and extract clock information associated with the transmitter. For example, the tuning circuit 108 may de-modulate the control signal from the transmit signal via the inductor 130 of the second Bias Tee circuit 128. The RF signal component of the transmit signal may be transmitted to the driven element 104 of the modal antenna 102 via the capacitor 128 of the second Bias Tee circuit 128.

In some embodiments, the antenna system 100 may include a first circuit board 129 and a second circuit board 131 that is physically separate from the first circuit board 129. The radio frequency circuit 112 may be disposed on the first circuit board 129. At least one of the tuning circuit 108 or modal antenna 102 may be disposed on the second circuit board 131. This may allow radio frequency circuit 112 to be physically separated from the tuning circuit and/or modal antenna 102 without employing multiple transmission lines or adversely affecting the operation of the antenna system 100.

In some embodiments, the RF signal may be defined within a first frequency band. The control signal may be defined within a second frequency band that is distinct from the first frequency band. For example, the first frequency band may range from about 500 MHz to about 50 GHz, in some embodiments from about 1 GHz to about 25 GHz, in some embodiments from about 2 GHz to about 7 GHz, e.g., about 5 GHz. The second frequency band may range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz.

Figure 3:
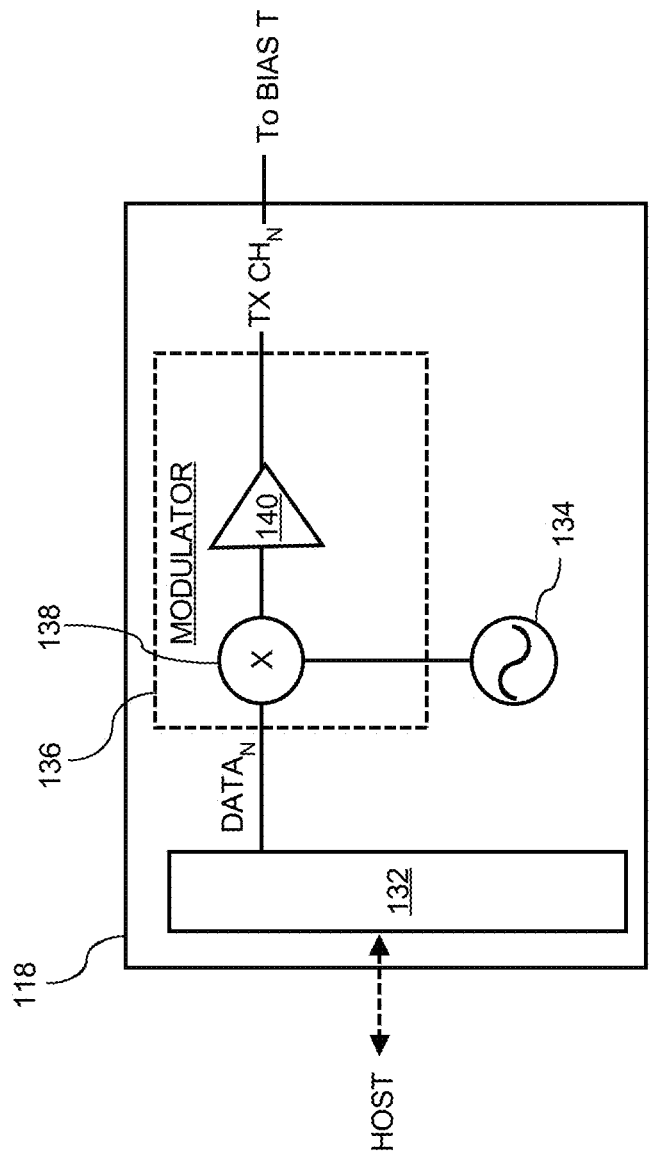
FIG. 3 illustrates a schematic diagram of an example control circuit of the antenna system according to example embodiments of the present disclosure.

FIG. 3 illustrates a schematic diagram of one embodiment of the control circuit 118 of the antenna system 100 illustrated in FIG. 2. The control circuit 118 may include a processor 132. The processor 132 may be configured to generate or receive control instructions for changing the mode of the modal antenna 102 (illustrated in FIG. 2), or otherwise adjusting the orientation or frequency of the radiation pattern of the modal antenna 102. For example, the processor 132 may receive the control instructions from another processor (represented by HOST in FIG. 3) and may generate an output that contains data (represented by DATAN in FIG. 3) that describes the instructions. The data may have any suitable bit depth. For example, in some embodiments the data may be in binary format. In other embodiments, the data may be in hexadecimal format, decimal format, etc.

The control circuit 118 may also include a carrier signal source 134. In some embodiments, the carrier signal source 134 may be configured to generate a carrier signal that includes a sinusoidal wave, which may have a generally constant frequency. In other embodiments, the carrier signal may be or include any suitable signal. For example, in some embodiments, the carrier signal may be or include any suitable repeating pattern, and is not limited to being sinusoidal or having a generally constant frequency.

The control circuit 118 may also include a modulator 136 that is configured to modulate the output of the processor onto the carrier signal to produce the control signal (represented by TX CHN in FIG. 3). The modulator 136 may include a multiplexer 138 that is configured to combine the output containing the data (represented by DATAN in FIG. 3), which may describe the control instructions, with the carrier signal from the carrier signal source 134. For example, the modulator 136 may be configured to scale the amplitude of the carrier signal from the carrier signal source 134 to produce the control signal, for example by performing amplitude shift keying modulation (e.g., on-off keying modulation), for example as described in greater detail below with reference to FIG. 4. The modulator 136 may also include an amplifier 140.

Figure 4A:
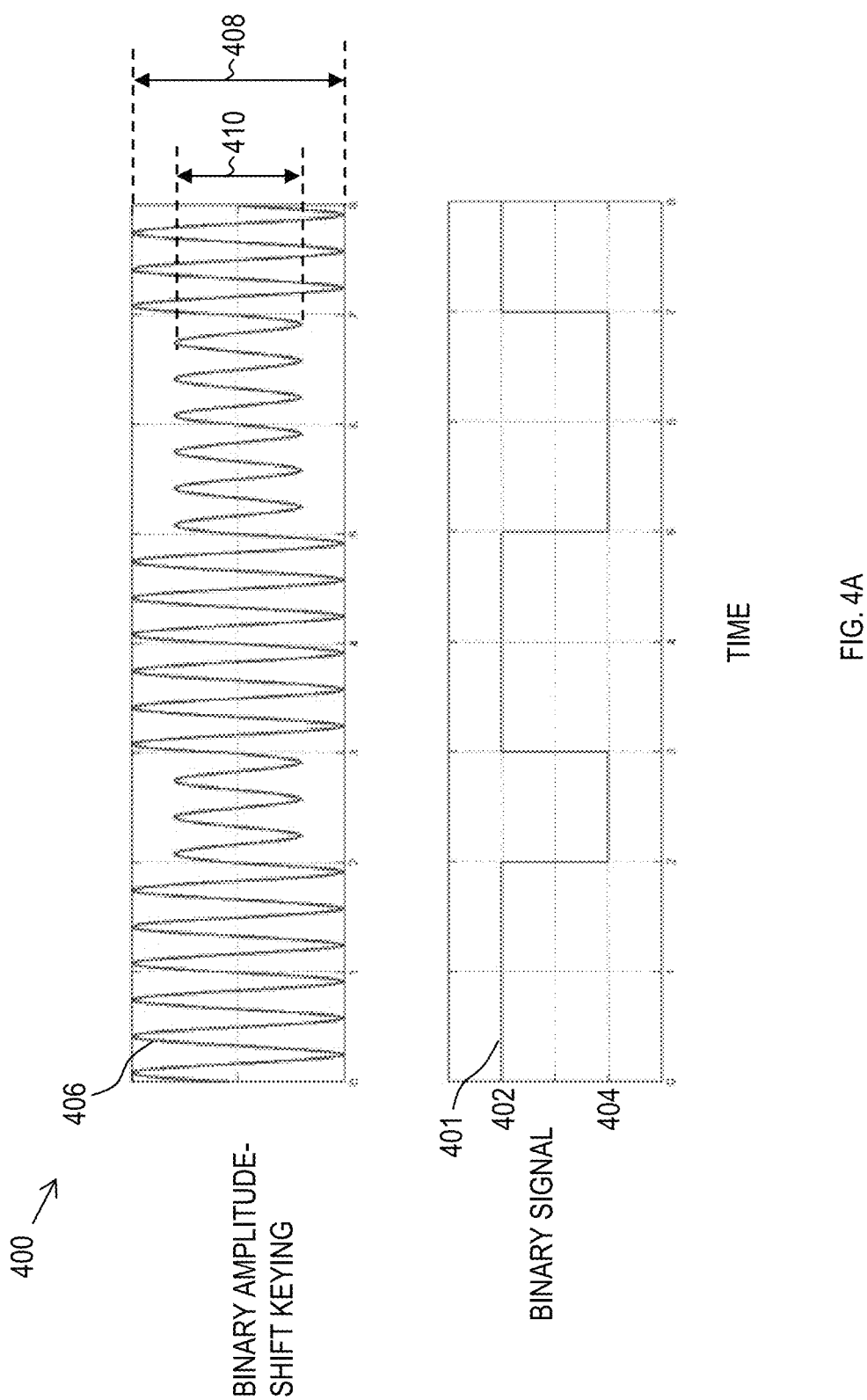
FIG. 4A illustrates a series of time-aligned charts representing simplified examples of binary amplitude-shift keying modulation.

FIG. 4A illustrates a series of time-aligned charts 400 representing a simplified example of binary amplitude-shift keying modulation. A binary signal 401 may alternate between a first voltage level 402 and a second voltage level 404 in a manner that describes the binary data set. The binary signal 401 may correspond to a simplified example of the output of processor 132, which may contain the data describing the control instructions, for example as described above with reference to FIG. 3. Amplitude-shift keying modulation may include representing the binary signal 401 by representing the first voltage level 402 as a sinusoidal signal 406 having a varying amplitude. For example, the sinusoidal signal 406 may have a first amplitude 408 that represents the first voltage 402 of the binary signal 401. The sinusoidal signal 406 may have a second amplitude 410 that represents the second voltage level 404 of the binary signal 401.

FIG. 4B illustrates another series of time-aligned charts 420 representing a simplified example of multilevel amplitude-shift keying modulation. Multilevel amplitude-shift keying modulation may include representing a data signal having greater bit depth than two. In other words, the data signal may be "m-ary," where m represents an integer greater than two. The multilevel signal 440 may switch between a plurality of voltage levels 452, 454, 456, 458, in a manner that describes a data set having a bit depth greater than two. The voltage levels 452, 454, 456, 458 of the multilevel signal 440 may be represented as a sinusoidal signal 430 having varying amplitudes. For example, each of the voltage levels 452, 454, 456, 458 of the multilevel signal 440 may be associated with a respective amplitude 462, 464, 466, 468 of the sinusoidal signal 430. The multilevel signal 440 may correspond to a simplified example of the output of the processor 132, which may contain the data describing the control instructions, for example as described above with reference to FIG. 3.

As indicated above, in some embodiments, the receiver (e.g., tuning circuit 108) may be configured to extract clock information from the transmit signal. The receiver may be configured to synchronize its operations (e.g., control an electrical characteristic associated with the parasitic element 106 to operate the modal antenna 102 in a plurality of different modes) with operations of the transmitter (e.g., the radio frequency circuit 112) based on the extracted clock information. For example, in some embodiments, the receiver may be free of a clock source that is separate from the clock source of the transmitter (e.g., the sinusoidal wave source 134 associated with the control circuit 118). In other embodiments, the receiver may include a clock source that is not utilized. Instead, the receiver may rely on the extracted clock information associated with the clock source of the transmit signal.

In some embodiments, the control signal may include a data frame that includes a training portion 470. The tuning circuit (e.g., receiver) may be configured to recognize the training portion 470 within the data frame to identify at least one of a start or an end of the data frame. For example, referring to FIG. 4B, the vertical dotted lines in the plot of the multilevel signal 440 may represent divisions between bits. A byte may include 8 bits, for example as illustrated in FIG. 4B.

The data frame may also include a data portion 472 that contains or describes data (e.g., control instructions for adjusting a mode of the modal antenna, as discussed above with reference to FIG. 1A through 1C) The receiver may also be configured to locate the data portion 472 within the data frame based on the identified location of the training portion 470 within the data frame. The training portion 470 may include a pre-determined series of bits and/or have a pre-determined location within the data frame. For instance, as illustrated in FIGS. 4A and 4B, the training portion 470 may include a set of consecutive bits at the start of the data (e.g., the first three bits). The data portion 472 may include another set of consecutive bits (e.g., the next five bits after the training portion 470). The training portion 470 may have any suitable bit-depth, length, and location within the data frame. Similarly, data portion 472 may have any suitable bit-depth, length, and location within the data frame. The data frame may have any suitable bit-depth and length. As example, in some embodiments, the data frame may include multiple bytes. A single training portion 470 may be included in the data frame, or multiple training portions 470 may be located within the data frame. Thus, the training portion(s) 470 may be configured to provide the receiver with a point of reference such that the receiver can locate the start of the data frame, the end of the data frame, or the data portion 472 within the data frame.

In some embodiments, the transmitter may be configured to modulate a clock signal onto the RF signal using multilevel amplitude-shift keying. The receiver may be configured to de-modulate the control signal and extract the clock signal including clock information associated with the transmitter from the RF signal. For example, referring to FIG. 4B, the clock signal may be or include at least a portion of the training portion 470. The receiver may be configured to identify the location of the data portion 472 within the data frame based on the clock information associated with the transmitter.

In some embodiments, the transmitter may be configured to modulate the clock signal onto the RF signal using a first set of amplitude levels and modulate the control signal onto the RF signal using a second set of amplitude levels that includes at least one amplitude level that is distinct from the first set of amplitude levels. As an example, in one embodiment, the clock signal may be represented or described at least partially within the training portion 470. Referring to FIG. 4B, in a simplified example, the first set of amplitude levels may correspond to amplitudes 462, 464 of the sinusoidal signal 430 and voltage levels 452, 454 of the multilevel signal 440. The second set of amplitude levels may correspond to amplitudes 466, 468 of the sinusoidal signal 430 and voltage levels 456, 458 of the multilevel signal 440. In this example, the first set of amplitude levels (associated with the control signal) is completely discrete from the second set of amplitude levels (associated with the clock signal) However, in other embodiments, the first set and second set of amplitude levels may partially overlap (e.g., may contain one or more of the same amplitude levels). This configuration may allow the receiver to more accurately and reliably locate and extract the clock signal and information from the RF signal.

Figure 5A:
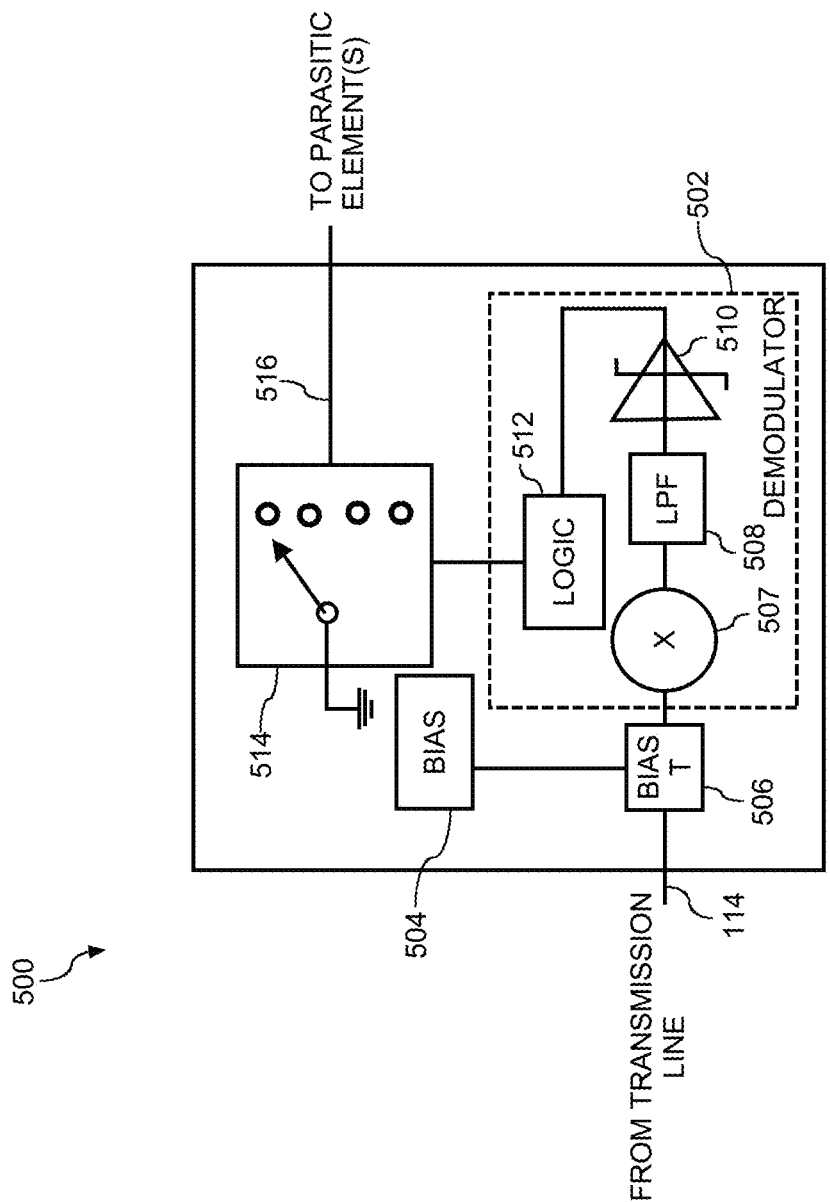
FIG. 5A illustrates a schematic diagram of an example tuning circuit of the antenna system according to example embodiments of the present disclosure.

FIG. 5A illustrates a schematic diagram of one embodiment of the tuning circuit 500 (e.g., the receiver), for example corresponding to the tuning circuit 108 discussed above with reference to FIG. 3, in accordance with aspects of the present disclosure. The tuning circuit 500 may include a demodulator 502 and a bias 504. The demodulator 502 may include a Bias Tee circuit 506 coupled with the bias 504 and a multiplexer 507 that is coupled with the transmission line 114 (illustrated in FIG. 2).

The tuning circuit 500 may also include a low pass filter 508 that is configured to filter at least one frequency band. For example, the low pass filter 508 may be configured to filter at least one frequency band that is higher than the frequency of the carrier signal frequency. As such, the low pass filter 508 may isolate or relatively increase the strength of the carrier signal frequency. The demodulator 502 may also include a diode 510, such as a Zener diode. The diode 510 may be coupled with a logic circuit 512 that is configured to interpret the control instructions associated with (e.g., contained within) the control signal.

The logic circuit 512 (e.g., processors, ASICS, etc. configured to execute computer-readable instructions to implement logic operations) may also be configured to control the operation of a switch 514 based on the control instructions associated with (e.g., contained within) the control signal. The switch 514 may be connected with ground and be configured to switch between one or more of a plurality of states. For example, the switch 514 may be configured to selectively connect an output 516 of the switch 514 with ground or otherwise vary the electrical connectivity of the output 516 to control an electrical characteristic associated with the parasitic element 106 (illustrated in FIG. 2) and operate the modal antenna in the plurality of different modes. For example, the switch 514 may be configured to adjust the operation of the tunable component 110 (illustrated in FIG. 2) to alter the electrical connectivity of the parasitic element 106 with a source or sink (e.g., a voltage source/sink or current source/sink). For example, the switch 514 may be configured to selectively connect the parasitic element 106 with ground.

In some embodiments, the tuning circuit 500 (e.g., the receiver) may be free of a clock source. For example, the receiver may be configured to de-modulate the control signal and extract clock information associated with the transmitter. The receiver may synchronize its operations with the transmitter based on the extracted clock information instead of employing a clock source that is separate from the clock source of the receiver. For example, the logic circuit 512 of the tuning circuit 500 (e.g., the receiver) may not employ a clock source that is separate from the clock source of the transmitter (e.g., the sinusoidal wave source 134 associated with the control circuit 118). Instead, the tuning circuit 500 (e.g., the receiver) may synchronize its operations with the control circuit 118 (e.g., the transmitter) based on the extracted clock information. For example, the tuning circuit 500 may be configured to demodulate the control signal. For example, the logic circuit 512 may be configured to sample the received signal (e.g., from the diode 510), extract clock information from the received signal, and then locate the data portion within the received signal using the clock information, for example as described above with reference to FIGS. 4A and 4B.

In some embodiments, the receiver may be configured to sample the transmit signal at a frequency that is significantly greater than a signal frequency associated with the transmit frequency. For example, the signal frequency associated with the transmit frequency may correspond with a frequency of the carrier signal (e.g., the sinusoidal signal 430 described above with reference to FIG. 4A.). As another example, the signal frequency associated with the transmit frequency may correspond with a frequency at which the amplitude of the carrier signal (e.g., sinusoidal signal 430) changes or switches between amplitude levels.

The receiver may be configured to sample the transmit signal at a sampling frequency that is sufficiently greater than the signal frequency associated with the transmit frequency such that changes in the amplitude of the carrier signal can be detected with sufficient accuracy to de-modulate the control signal and/or clock signal from the transmit signal and decipher data (e.g., instructions) contained therein. For example, the receiver may be configured to sample the transmit signal at a sampling frequency that is at least the Nyquist rate or Nyquist frequency of the signal frequency. In some embodiments, the receiver may be configured to sample the transmit frequency at a sampling frequency that is a pre-determined multiple of the signal frequency associated with the transmit frequency. For example, in some embodiments, the frequency may be 2 to 1,000 times greater than the signal frequency, in some embodiments 5 to 500 times, and in some embodiments 10 to 100 times greater.

Figure 5B:
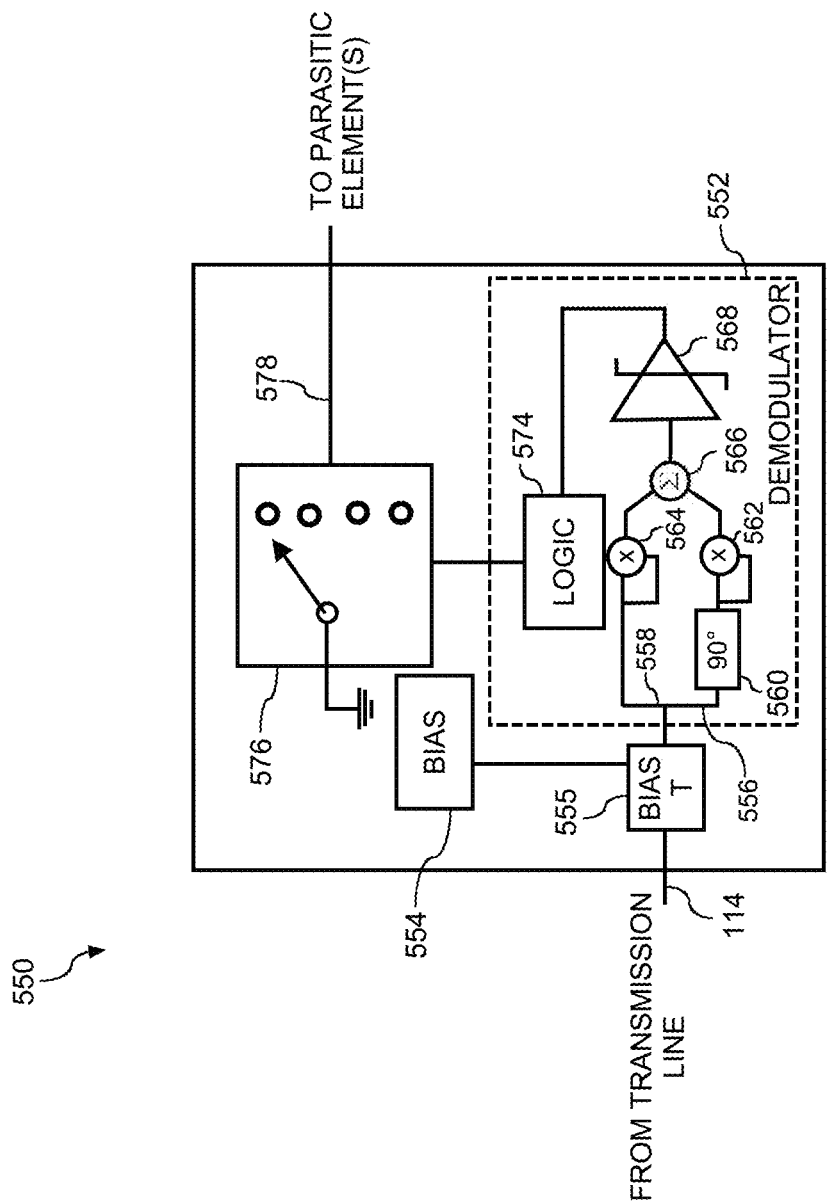
FIG. 5B illustrates a schematic diagram of another example tuning circuit of the antenna system according to example embodiments of the present disclosure.

FIG. 5B illustrates a schematic diagram of another embodiment of a tuning circuit 550 according to aspects of the present disclosure. The tuning circuit 550 may generally include a demodulator 552 and a bias 554. The demodulator 552 may include a Bias Tee circuit 555 coupled with the bias 554. The demodulator 552 may be configured to divide the signal from the transmission line 144 into a first path 556 and a second path 558. The first path 556 may include a 90° phase shift element 560 that is configured to shift a phase of received signals by 90°. The signals in the second path 558 and first path 556 may be referred to as I and Q signals, respectively, where "I" stands for in-phase, and "Q" stands for quadrature. The first path 556 may include a first multiplexer 562 connected with an output of the 90° phase shift element 560 The second path 558 may include a second multiplexer 564. A signal summation element 566 may configured to sum the outputs from the multiplexers 562, 564. The resulting signal from the signal summation element 566 may be or include a DC signal that is proportional to the amplitude of the signal from the transmission line 114. The process described above may be described as "IQ summation" or "squared IQ summation." Such IQ summation operation may eliminate high frequency signal residuals without using a low pass filter, for example as described above regarding the low pass filter 508 of FIG. 5A, which may have several benefits. For example, data transmission speeds may not be limited by characteristics of the low pass filter, such as cutoff frequency or time constant (e.g., RC time constant). As a result, the tuning circuit 550 of FIG. 5B may provide higher data transmission speeds than a tuning circuit that includes a low pass filter, such as the tuning circuit 500 described above with reference to FIG. 5A.

The demodulator 552 may also include a diode 568, for example as described above with regards to the diode 510 of FIG. 5A. The diode 568 may be coupled with a logic circuit 574, for example as described above with regards to the logic circuit 512 of FIG. 5A, that is configured to interpret the control instructions associated with (e.g., contained within) the control signal. The tuning circuit 550 may include a switch 576, for example as described above with regards to the switch 514 of FIG. 5A, which may be controlled by the logic circuit 574 to selectively connect an output 578 of the switch 576 with ground or otherwise vary the electrical connectivity of the output 578 of the switch 576 to control an electrical characteristic associated with the parasitic element 106 (illustrated in FIG. 2) and operate the modal antenna in the plurality of different modes.

Figure 6:
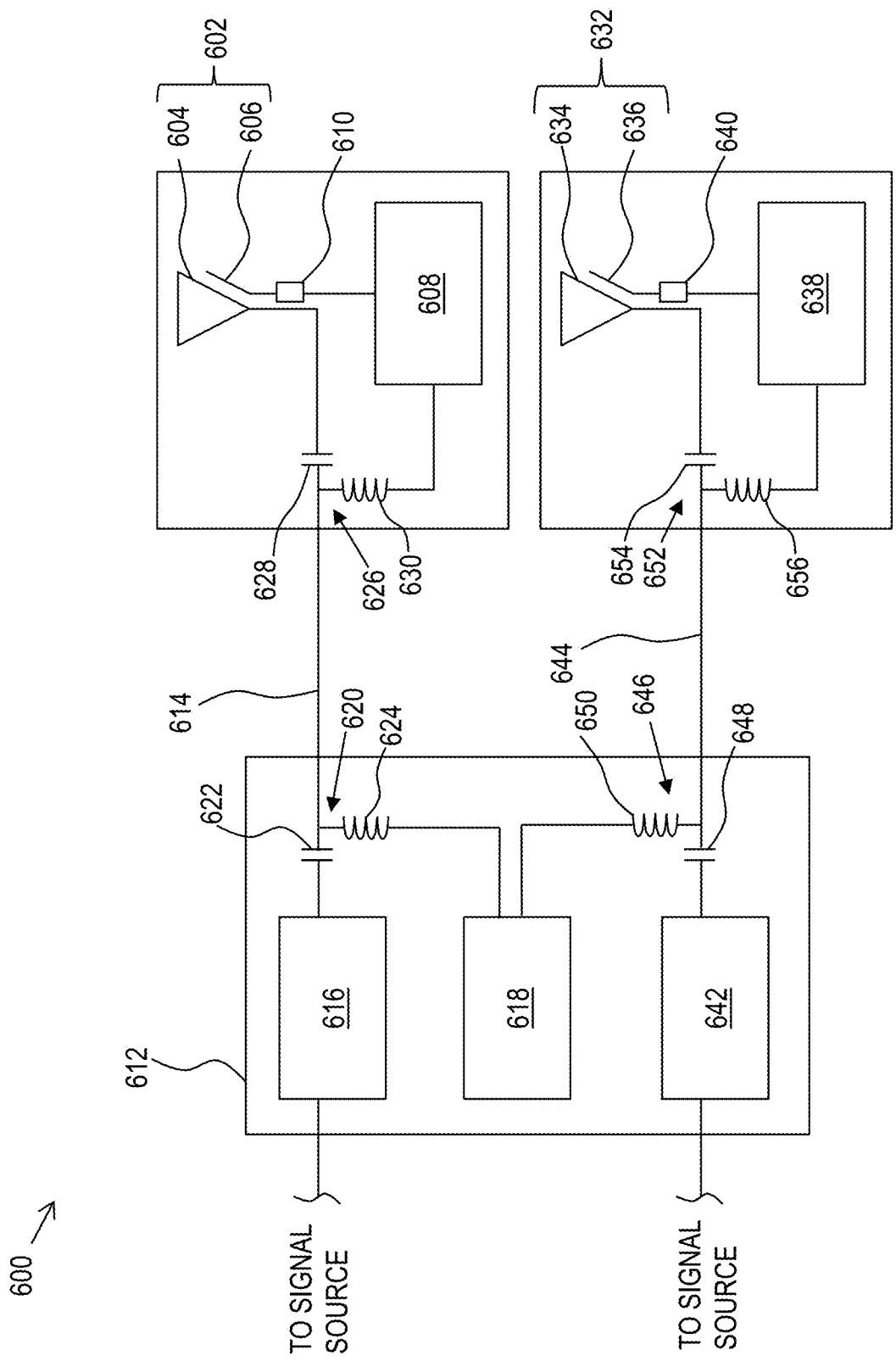
FIG. 6 illustrates a schematic diagram of an antenna system according to example embodiments of the present disclosure.

FIG. 6 illustrates another embodiment a schematic diagram of an embodiment of an antenna system 600 in accordance with aspects of the present disclosure. The antenna system 600 may be generally similarly configured to the antenna system 100 described above with reference to FIG. 2. For example, the antenna system 600 may include a modal antenna 602 including a driven element 604 and parasitic element 606, a tuning circuit 608, an RF circuit 612, a transmission line 614, front end module 616, control circuit 618, a first Bias Tee circuit 620 including a capacitor 622 and inductor 624, and a second Bias Tee circuit 626 including a capacitor 628 and inductor 630.

The antenna system 600 may also include a second modal antenna 632 including a driven element 634 and a parasitic element 636. A second tuning circuit 638 may be configured to control an electrical characteristic associated with the parasitic element 636 to operate the modal antenna 632 in the plurality of different modes. For example, a second tunable component 640 may be coupled with the parasitic element 636. The tuning circuit 638 may be configured to control the second tunable component 640 to alter the electrical connectivity of the parasitic element 636 of the second modal antenna 632 with a voltage or current source or sink, such as connecting the parasitic element 106 with ground.

The radio frequency circuit 612 may include a second front end module 642 and a second transmission line 644. The second front end module 642 may be configured to generate and/or amplify a second RF signal. The control circuit 618 may be configured to modulate a second control signal onto the second RF signal to generate a second transmit signal. In some embodiments, the control circuit 618 may modulate the second control signal onto the second RF signal using amplitude-shift keying modulation, for example as explained above with reference to FIGS. 3 and 4.

The second transmission line 644 may be coupled with various components using Bias Tees configured to aid in the combination and/or separation of signals occupying various frequency bands. For example, a third Bias Tee circuit 646 may couple the second front end module 642 and the control circuit 618 with the second transmission line 644. The third Bias Tee circuit 646 may include a capacitor 648 coupling the second front end module 642 with the second transmission line 644 and an inductor 650 coupling the control unit 618 with the second transmission line 644.

A fourth Bias Tee circuit 652 may couple the second transmission line 644 with the driven element 634 of the second modal antenna 632 and the tuning circuit 108. The fourth Bias Tee circuit 652 may include a capacitor 654 coupling the second transmission line 644 with the driven element 634 of the second modal antenna 632 and a inductor 656 coupling the second transmission line 644 with the second tuning circuit 638.

The second front end module 642 may transmit the second RF signal through the capacitor 648 of the third Bias Tee circuit 648. The control circuit 618 may modulate the second control signal onto the second RF signal through the inductor 650 of the third Bias Tee circuit 646 to generate the second transmit signal. The second tuning circuit 638 may de-modulate the control signal from the second transmit signal via the inductor 656 of the fourth Bias Tee circuit 652. The RF signal component of the second transmit signal may be transmitted to the driven element 634 of the second modal antenna 632 via the capacitor 654 of the fourth Bias Tee circuit 652.

In this embodiment, the control circuit 618 may have a separate output associated with each of the transmission lines 614, 644. The control circuit 618 may be similarly configured as the control circuit 118 described above with reference to FIG. 3 and may include additional or components configured to provide the separate output for the second transmission line 644. For example, the control circuit 618 may include a second processor 132, sinusoidal wave source 134, modulator 136, multiplexer 138, and/or amplifier 140 such that a second output is provided.

In some embodiments, the antenna system may include a plurality of antennas in a multiple-in-multiple-out (MIMO) configuration. Multiple pairs of control circuits and tuning circuits may be configured to control multiple modal antennas as well as multiple passive antennas. For example, the antenna system may include N tuning circuits (each paired with a respective control circuit) configured to control the operation of M modal antennas and (N-M) passive antennas, where N and M are each positive integers, and where N is greater than or equal to M. Additionally, in some embodiments, one control circuit may include multiple outputs and be paired with multiple tuning circuits, for example as described with reference to FIG. 6. In any event, the number of tuning circuits, N, may range up to any suitable number. For example, in some embodiments, N may range from 2 to 20, or greater. M may also range from 2 to 20, or greater.

It should be understood that many variations are possible within the scope of this disclosure. For example, in other embodiments, a separate control circuit may be associated with the each transmission line 614, 644. Additionally, in other embodiments, a single front end module may be configured to generate the respective RF signals. In some embodiments, a single tuning circuit may be configured to control an electrical characteristic associated with a parasitic element of each modal antenna of the system. Moreover, in some embodiments, the system may include more than two modal antennas. Additionally, in some embodiments, the system may include a combination of one or more modal antennas and one or more non-modal or passive antennas that are not configured to operate in a plurality of modes. In some embodiments, one or more modal antennas may include more than one parasitic elements. A single control circuit may be configured to adjust respective tunable elements associated with the parasitic elements to control electrical characteristics associated with the parasitic elements and operate the modal antenna in the plurality of different modes. In other embodiments, multiple control circuits may be used to respectively adjust the tunable elements. It should be understood that yet other variations, modification, combinations, and the like are possible with the scope of this disclosure.

Figure 7:
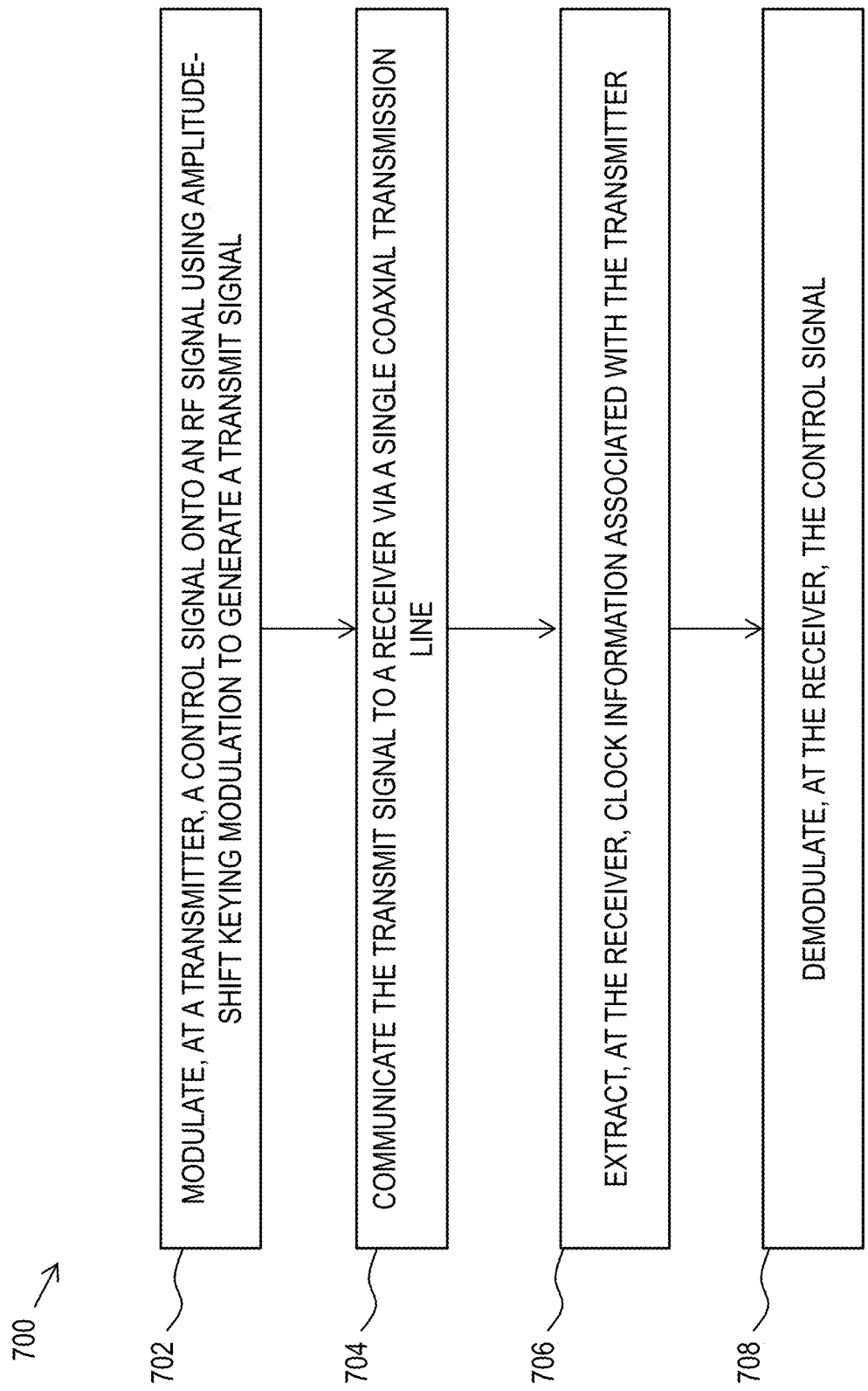
FIG. 7 depicts a flow diagram of an example method according to example embodiments of the present disclosure.

FIG. 7 depicts a flow diagram of an example method 700 according to example embodiments of the present disclosure. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 700 is generally discussed with reference to the antenna systems 200, 600 described above with reference to FIGS. 2 and 6. However, it should be understood that aspects of the present method 700 may find application with any suitable antenna system including a modal antenna. Moreover, it should be understood that aspects of the present method 700 may find application in any system involving data transmission, including systems other than antenna systems.

The method 700 may include, at (702), modulating, at a transmitter, a control signal onto an RF signal using amplitude-shift keying modulation to generate a transmit signal. For example, the control signal may contain control instructions for changing the mode of the modal antenna or otherwise adjusting the orientation or frequency of the radiation pattern of the modal antenna. For example, the radio frequency circuit 112 may include the control circuit 118 that is configured to modulate the control signal onto the RF signal using binary or multilevel amplitude-shift keying modulation to generate a transmit signal, for example as described above with reference to FIGS. 3, 4A, and 4B.

In some embodiments, modulating the control signal onto the RF signal may include selectively varying an amplitude associated with a carrier signal. For example, referring back to FIG. 4A, the amplitude may be varied between a first amplitude 408 and a second amplitude 410, which represent a first voltage 402 and a second voltage 404, respectively, of an associated binary signal 401. Referring to FIG. 4B, in some embodiments, the amplitude may be varied between a plurality of amplitudes 462, 464, 466, 468, which may respectively represent voltage levels 452, 454, 456, 458 associated with the multilevel signal 440.

The method 700 may include, at (704), communicating the transmit signal to a receiver via a single coaxial transmission line. For example, as described above with reference to FIG. 4, the radio frequency circuit 112 may include a front end module 116 that may communicate the RF signal through a capacitor 122 of a first Bias Tee 120, through a transmission line 114, and through a capacitor 128 of a second Bias Tee 128 to a driven element 104 of a modal antenna 102. The control circuit 118 may modulate a control signal onto the RF signal through the inductor 124 of the first Bias Tee 120, through the transmission line 114, and through the inductor 130 of the second Bias Tee 128 to the tuning circuit 108.

The method 700 may include, at (706), extracting, at the receiver, clock information associated with the transmitter. The transmitter may be configured to modulate a clock signal onto the RF signal using binary or multi-level amplitude-shift keying, for example as described above with reference to FIGS. 4A and 4B. The receiver may also be configured to locate a start and/or an end of the data frame and/or locate a data portion 472 within the data frame based on an identified location of a training portion 470 within the data frame, for example as described above with reference to FIGS. 4A and 4B.

The method 700 may include, at (708), demodulating the control signal at the receiver (e.g., the tuning circuit). For example, as described above with reference to FIGS. 2 and 5, the tuning circuit 108, 500 may be configured to demodulate the control signal from the transmit signal via the inductor 130 of the second Bias Tee 126. The tuning circuit 108, 500 may also be configured to filter and/or amplify the control signal to isolate or relatively increase the strength of a carrier signal frequency associated with a carrier signal.

The receiver may be configured to demodulate the control signal using the clock information extracted at (706). For example, the receiver may be configured to locate a data portion 472 within the data frame based on the location of the training portion 470 within the data frame. A logic circuit 512 may be configured to interpret data contained within the control signal. For example, the logic circuit 512 may be configured to interpret instructions for controlling an electrical characteristic associated with a parasitic element of a modal antenna.

In some embodiments the method 700 may further include controlling, from the transmitter (e.g., control circuit 118) an electrical characteristic associated with a parasitic element of a modal antenna via the control signal to operate the modal antenna in a plurality of different modes. Each mode may be associated with a different radiation pattern for the modal antenna. For example, the tuning circuit 108, 500 may be configured to control a switch 514 to selectively connect an output 516 of the switch 514 with ground or otherwise vary the electrical connectivity of the output 516 of the switch 514 to control an electrical characteristic associated with the parasitic element 106 (illustrated in FIG. 2) and operate the modal antenna in the plurality of different modes. For example, the switch 515 may be configured to adjust the operation of the tunable component 110 (illustrated in FIG. 2) to alter the electrical connectivity of the parasitic element 106 with a voltage or current source or sink, such as electrically shorting the parasitic element 106 with ground.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system comprising:
   a transmitter comprising a clock source, the transmitter configured to modulate a control signal and a clock signal onto an RF signal using amplitude-shift keying modulation to generate a transmit signal;
   a receiver, the receiver being free of a clock source; and
   a transmission line coupling the transmitter to the receiver;
   wherein:
   the transmitter is configured to transmit the transmit signal over the transmission line to the receiver,
   the receiver is configured to de-modulate the control signal and extract the clock signal from the transmitter, and
   the clock source of the transmitter is configured to operate as a clock source for the receiver based on the clock signal extracted from the control signal by the receiver.

2. The system of claim 1, wherein the control signal comprises a data frame, the data frame comprises a training portion, and wherein the receiver is configured to recognize the training portion to identify at least one of a start or an end of the data frame.

3. The system of claim 1, wherein the data frame comprises a training portion and a data portion, and wherein the receiver is configured to identify a location of the training portion and locate the data portion within the data frame based on the identified location of the training portion within the data frame.

4. The system of claim 1, wherein the transmitter is configured to modulate the control signal onto the RF signal using binary amplitude-shift keying modulation.

5. The system of claim 1, wherein the transmitter is configured to modulate the control signal onto the RF signal using multi-level amplitude-shift keying modulation.

6. The system of claim 1, wherein the transmitter is configured to modulate the clock signal onto the RF signal using multi-level amplitude-shift keying.

7. The system of claim 1, wherein the transmitter is configured to modulate the clock signal onto the RF signal using a first set of amplitude levels, and wherein the transmitter is configured to modulate the control signal onto the RF signal using a second set of amplitude levels that includes at least one amplitude level that is distinct from the first set of amplitude levels.

8. The system of claim 1, wherein the transmitter is configured to modulate the control signal onto the RF signal by selectively varying an amplitude associated with a carrier signal between a first amplitude and a second amplitude.

9. The system of claim 8, wherein the transmitter is configured to modulate the clock signal onto the RF signal by selectively varying the amplitude associated with the carrier signal to a third amplitude that is distinct from the first amplitude and second amplitude.

10. The system of claim 8, wherein the carrier signal comprises at least one of a generally constant frequency sinusoidal wave or a repeating pattern.

11. The system of claim 1, wherein the transmission line is a single coaxial cable.

12. The system of claim 1, wherein the receiver is configured to synchronize operations of the receiver with operations of the transmitter based on the clock signal extracted from the control signal.

13. The system of claim 1, further comprising a first circuit board and a second circuit board that is physically separate from the first circuit board, and wherein the transmitter is disposed on the first circuit board, and the receiver is disposed on the second circuit board.

14. The system of claim 1, further comprising a tuning circuit and a modal antenna, wherein the tuning circuit includes the receiver, and wherein the receiver is configured to adjust a mode of the modal antenna based on the control signal.

15. The system of claim 1, further comprising a front end module and a control circuit, and wherein the front end module is configured to generate the RF signal, and the control circuit is configured to generate the control signal.

16. An antenna system, comprising:
a first modal antenna comprising a first driven element and a first parasitic element positioned proximate to the first driven element, the first modal antenna operable in a plurality of different modes, each mode associated with a different radiation pattern of the first modal antenna;
a second modal antenna that is separate from the first modal antenna, the second modal antenna comprising a second driven element and a second parasitic element positioned proximate to the second driven element, the second modal antenna operable in a plurality of different modes, each mode associated with a different radiation pattern of the second modal antenna;
a first tuning circuit configured to control an electrical characteristic associated with the first parasitic element to operate the first modal antenna in the plurality of different modes;
a second tuning circuit configured to control an electrical characteristic associated with the second parasitic element to operate the second modal antenna in the plurality of different modes;
a radio frequency circuit configured to generate a plurality of control signals;
a first transmission line coupling the radio frequency circuit to the first modal antenna; and
a second transmission line coupling the radio frequency circuit to the second modal antenna, wherein:
the radio frequency circuit is configured to adjust a mode of the first modal antenna based on a first control signal of the plurality of control signals; and
the radio frequency circuit is configured to adjust a mode of the second modal antenna based on a second control signal of the plurality of control signals that is different from the first control signal.

17. The antenna system of claim 16, wherein:
the radio frequency circuit is configured to modulate the first control signal onto a first RF signal to generate a first transmit signal for communication over the first transmission line to the first tuning circuit; and
the radio frequency is configure to modulate the second control signal onto a second RF signal to generate a second transmit signal for communication over the second transmission line to the second tuning circuit.

18. The antenna system of claim 17, wherein:
the first tuning circuit is configured to demodulate the first control signal and extract clock information from the first control signal to interpret the first control signal such that the radio frequency circuit can adjust the mode of the first modal antenna via the first control signal; and
the second tuning circuit is configured to demodulate the second control signal and extract clock information from the second control signal to interpret the second control signal such that the radio frequency circuit can adjust the mode of the second modal antenna via the second control signal.

19. The antenna system of claim 17, wherein:
the radio frequency circuit is configured to modulate the first control signal onto the first RF signal using amplitude-shift keying modulation; and
the radio frequency circuit is configured to modulate the second control signal onto the second RF signal using amplitude-shift keying modulation.

20. The antenna system of claim 17, wherein the radio frequency circuit comprises:
a first front end module coupled to the first tuning circuit via the first transmission line, the first front end module configured to generate the first RF signal;
a second front end module coupled to the second tuning circuit via the second transmission line, the second front end module configured to generate the second RF signal; and
a control circuit coupled to the first front end module and the second front end module, the control circuit configured to generate the first control signal for the first front end module and the second control signal for the second front end module.

* * * * *